United States Patent [19]

Millar

[11] Patent Number: 4,964,671
[45] Date of Patent: Oct. 23, 1990

[54] INTERIOR BUS CONFIGURATION

[76] Inventor: Russell Millar, 824 Demet Dr., Las Vegas, Nev. 89119

[21] Appl. No.: 377,889

[22] Filed: Jul. 10, 1989

[51] Int. Cl.$^5$ .............................................. B60N 3/00
[52] U.S. Cl. .................... 296/178; 296/24.1; 296/64; 297/163; 297/191
[58] Field of Search ........................ 296/64, 178, 24.1; 105/345, 6-8; 297/146, 163, 191

[56] References Cited

U.S. PATENT DOCUMENTS

| | | | |
|---|---|---|---|
| 997,704 | 7/1911 | Rodden | 105/345 |
| 2,414,730 | 1/1947 | Flogans | 296/64 |
| 2,635,889 | 4/1953 | Concello | 52/7 |
| 3,217,366 | 11/1965 | Wenger | 52/6 |
| 3,765,133 | 10/1973 | Smothers | 52/7 |

FOREIGN PATENT DOCUMENTS 413025 5/1946 Italy.

Primary Examiner—Robert R. Song

[57] ABSTRACT

A bus interior configuration has an entertainment station located just behind the driver's compartment. The entertainment station has a video display screen, a video cassette recorder/player, a compact disc player, an audio player and a stereo speaker system. Theater-type reclining seats are arranged in rows that are tiered upwardly from the front to the back of the bus to provide each passenger with an unobstructed view of the video display screen. The back of each seat is provided with a fold down tray table and a fold out reading light. A wet bar is provided in the rear of the bus adjacent the restroom area.

13 Claims, 2 Drawing Sheets

INTERIOR BUS CONFIGURATION

BACKGROUND OF THE INVENTION

This invention involves the interior configuration of a bus, and more particularly an interior which is contouring figured to increases the comfort and enjoyment of long distance travel.

Bus transportation has long been an economical and convenient mode of transportation. A significant portion of the bus transportation business has been inter-city trips. Regularly scheduled bus service exists between almost every city and town in the continental United States. This is of great benefit to those people who did not live in an area served by airline or train service or who need to travel to such an area.

Of more recent development is the chartered bus trip. A group of people wishing to travel to a particular location for a specified period of time can charter a bus to transport the entire group. This form of travel is quite popular for sporting events or trips to destination resort locations such as Las Vegas or Atlantic City.

One of the drawbacks to bus transportation has been the lack of comfort to which the bus passenger has been subjected. The conventional bus configuration has utilized a plurality of rows of seats facing the front of the bus. The floor of the bus is parallel to the roof line so that each passenger seat has the same vertical elevation as all the other seats. While a passenger may have a limited view out of the window adjacent his seat, the passenger's forward view is restricted by the seat back directly in front of him. The passenger also experiences a feeling of confinement. The height of the back of the seat in front of him is such as to close off his forward view and makes the passenger feel that he is sitting in a box.

Another drawback to bus transportation is the relative tedium to which the passenger is subjected during inter-city or long distance trips. The lack of a suitable interior bus configuration has inhibited the bus industry from supplying entertainment to its passengers to overcome the tedium that accompanies long distance travel.

It is an object of the present invention to provide an interior bus configuration that increases the comfort and enjoyment of bus patrons during travel, especially long distance travel during inter-city or charter bus trips.

It is a feature of the present invention that the interior of bus is configured with theater-type reclining passenger seats. Each seat is provided with a tray table and reading light configuration mounted in the seat back of the adjoining seat. The seats are laid out in rows of four seats across with a central aisle. The seating is tiered upward from the front of the bus toward the back to give each passenger increased forward and lateral sight clearance. A video display screen is positioned in the forward interior of the bus behind the driver's compartment to allow the display of movies or television programs. A video cassette recorder is connected to the video display screen. An audio stereo system is also provided to disseminate the audio portion of the movie or television program that is being displayed on the video display screen. The audio stereo system also functions to provide music, news, sports or other information to the passengers. The bus interior may be provided with a wet bar in the rear adjacent the restrooms.

It is an advantage of the present invention that the tedium of bus travel will be mitigated. The present invention is particularly advantageous on busses that are used for long trips, such as inter-city routes or charter bus service.

SUMMARY OF THE INVENTION

A bus interior is configured to provide theater-type reclining seats tiered upward in rows from the front toward the back of the bus. A video display screen and an audio stereo system are provided just behind the driver's compartment and facing the passenger area. Each seat is provided with a tray table and a reading light. A wet bar is provided in the rear of the bus.

BRIEF DESCRIPTION OF THE DRAWINGS

FIG. 3 is a partial view of the back of a seat showing the tray table and reading light of the present invention.

DETAILED DESCRIPTION OF THE PREFERRED EMBODIMENTS

Figure 1:
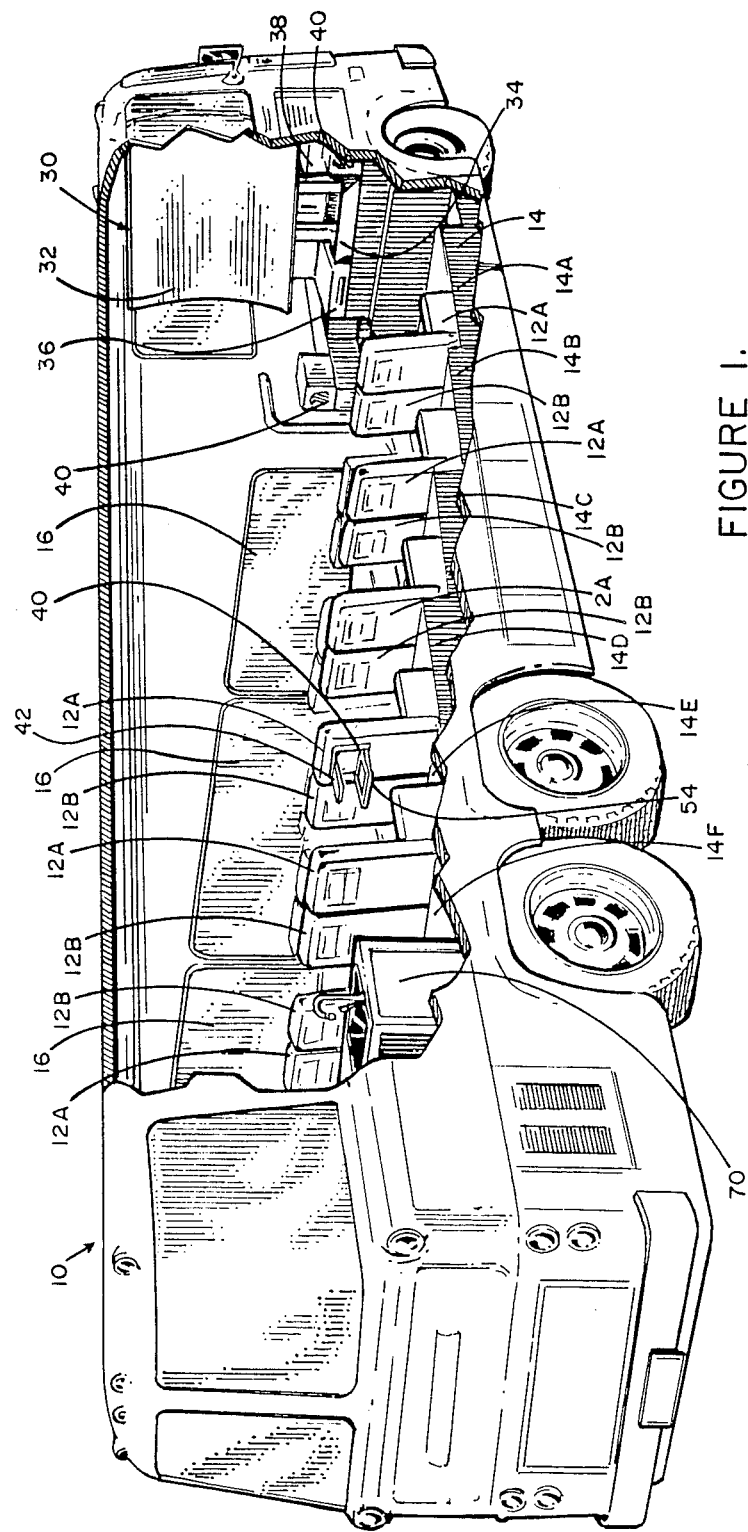
FIG. 1 is a perspective view of a bus showing in cutaway the configuration of the bus interior of the present invention.

A bus 10 is shown in FIG. 1, the bus 10 being modified in accordance with the present invention to have its interior configured for increased passenger comfort and enjoyment.

A plurality of passenger seats 12 are arranged on the interior of the bus. As shown in FIG. 1, each row of seats has four seats 12 arranged side by side across the width of the bus. The seats are arranged in a two-by-two configuration with an aisle running lengthwise down the approximate center of the bus. Thus in each row of seats 12, there are two aisle seats 12B and two window seats 12A. The number of seats in each row can be varied according to the width of the bus, the width each seat and the width of the aisle. Likewise the aisle opening between the row of seats can be modified to provide for three-by-one seating or four-by-zero seating (i.e., the aisle would not extend between adjoining seats but rather along the end of the entire row of seats).

The seat 12 may be of any suitable design, but preferably theater-type reclining seats are utilized to provide for increased comfort of the bus passenger.

Each row of seats 12 is mounted to a step 14 on the interior floor of the bus. The interior floor is tiered upward in a series of steps 14A, 14B, 14C, 14D and 14E from the front of the bus toward the back. For example, step 14B is higher than step 14A so that each passenger will have an improved view toward the front of the bus. The height of each step relative to the adjacent step can be varied depending on overall height of the bus and the number of rows of seats provided.

Figure 2:
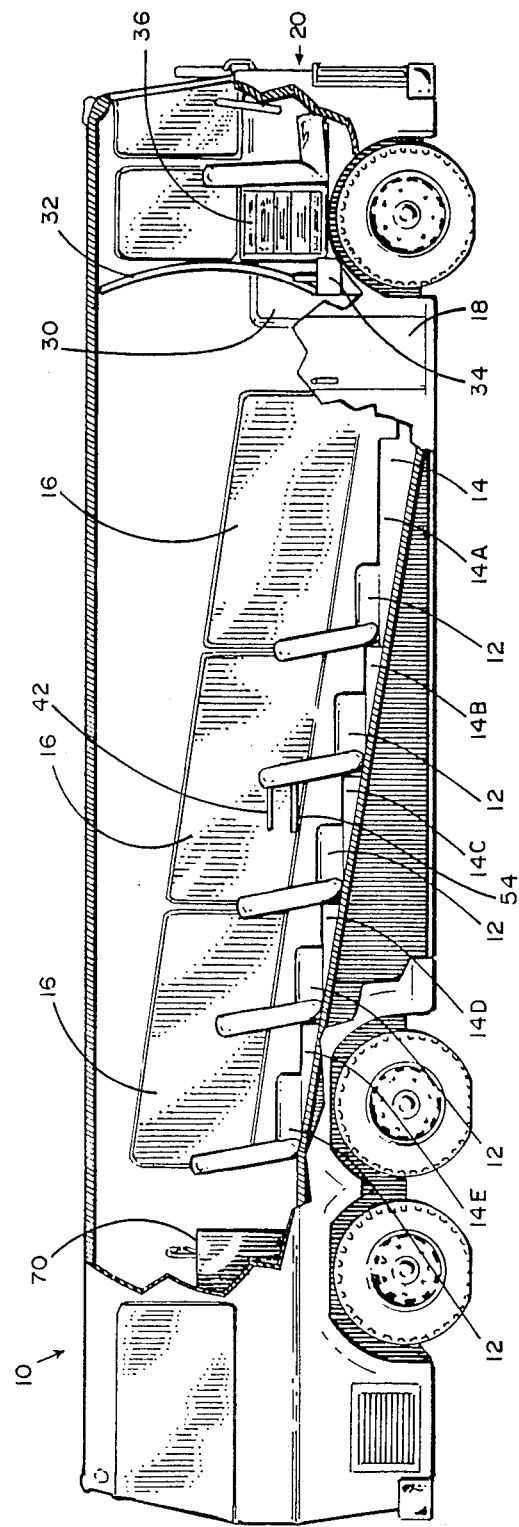
FIG. 2 is a side view of a bus showing in cutaway the configuration of the bus interior of the present invention.

A series of windows 16 are provided along the side of each bus. In the preferred embodiment, the windows should be oriented in a gradually decreasing level from the back of the bus toward the front at approximately the level of the head of a passenger sitting in a seat to make it most convenient for the passenger to look out the window and observe the passing scenery. In order to increase the usefulness of the window, each window 16 is oriented so that the full window pane lies between each row of seats as shown in FIG. 2.

The height of each window 16 is also tiered to generally follow the slope of the row of seats from the front toward the back of the interior of the bus. In the most preferred embodiment, the slope of the windows 16 from the back of the bus interior to the front will conform exactly to the slope of the floor. Since the slope of the floor determines the placement of each seat 12, this arrangement of the windows in relationship to the floor ensures that a passenger will have the same relative view out of a window regardless of which seat the passenger is sitting in.

At the front end of the interior of the bus, a driver's compartment 20 is provided. Just to the rear of the driver,s compartment 20, an entertainment station 30 is located. The entertainment station 30 comprises a video display screen 32, a video cassette recorder/player 34, a compact disc player 36, an audio player 38 and audio speakers 40.

The video display screen 32 is oriented toward the passenger seats 12 to allow each passenger to view movies, television programs and other video displays at any time while the passenger is on board the bus. Prerecorded movies and other features, including travel information, safety instruction or even commercials can be displayed on the video display screen by use of the video cassette recorder/player. The compact disc player 36 and the audio player 38 can be used in any known manner to provide audio entertainment to the passengers through the speakers 40. The audio portion can be provided to the passengers in the form of audio only or in conjunction with whatever is being displayed on the video display screen 32 The speakers 40 can also be used by the driver to disseminate information to the passengers.

Also, as shown in FIGS. 1 and 2, a wet bar 70 is provided in the rear of the bus at a location adjacent the typical restroom facilities. The wet bar 70 includes a faucet for obtaining water as well as a drain system which can be hooked into the restroom drain apparatus. Optionally, the wet bar may contain a refrigerator/freezer for maintaining beverages and other items cool as well as providing for a supply of ice cubes.

On the exterior of the bus just behind the front tire, the access door 25 (shown in phantom) is located. When the access door 25 is opened, the passengers may enter or exit the bus by passing down the center aisle and moving just in front of the entertainment station 30. The driver accesses the driver's compartment 20 by entering through the door 25, passing in front of the entertainment station 30, turning right between the entertainment station 30 and the windows 16 and moving through a small passageway into the driver's compartment 20. This configuration effectively isolates the driver from the passenger area which improves the driver's ability to operate the bus without distraction from the passengers.

FIG. 3 shows a tray table and reading light configuration mounted in the back of a seat 12. A plastic component 40 is fitted into a recess in the back of the seat 12. The component 40 has a light slot 48 in which is pivotally mounted a light arm 42. The end of the light arm 42 is provided with a reading light 44. The reading light can be installed to automatically turn on when the light arm 42 is manually pivoted out of the light slot 48. Alternatively, a switch can be provided on the light arm to allow manual activation of the reading light 44.

Below the light slot 48, the component 40 is provided with a table recess 50 in which is pivotally mounted a tray table 54. The tray table 54 has a plate holder area 56 and a glass holder area 58, both of which are recessed into the surface of the tray table 54. A latch 60 is pivotally attached to the component 40 to secure the tray table 54 when it is pivoted into the closed position.

The present invention provides a bus interior configuration that alleviates the tedium of long-distance travel. The use of a single, large video display screen gives the passengers the feeling of being in a movie theater. The tiered seating arrangement permits a relatively unobstructed view of the video display screen so that each passenger is not blocked by the back of the seat in front of him. The tiered seating also alleviates the feeling of confinement that bus passengers experience, especially on long-distance trips. In a conventional bus configuration without tiered seating, a passenger typically feels confined because of the close proximity and height of the back of the seat directly in front of him. The bus interior configuration of the present invention also physically separates the driver from the passenger area thereby allowing the driver to concentrate on his driving duties and not be distracted by the passengers. The entertainment station 30 provides recreation to the passengers and minimizes the possibility that boredom on a long-distance trip might lead to disruption.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

I claim:

1. An interior bus configuration comprising:
   (a) a driver compartment at the front end of the bus,
   (b) a passenger area toward the rear of the bus behind the driver compartment,
   (c) the passenger area having a plurality of rows of seats, each seat facing toward the front of the bus,
   (d) each row of seats mounted on a step on the interior floor of the bus,
   (e) each step becoming progressively higher from the front of the bus toward the back so that the plurality of rows of seats are tiered,
   (f) an entertainment station located on the interior of the bus immediately behind the driver compartment and at the front of the passenger area, the entertainment station including a video display screen, and
   (g) a series of windows along each side of the bus, the windows being tiered to generally follow the tiering of the seats from the front of the bus to the back.

2. The interior bus configuration of claim 1 wherein each row of seats has four seats.

3. The interior bus configuration of claim 2 wherein each row of seats is arranged in two-by-two groups with an aisle between the groups of seats.

4. The interior bus configuration of claim 1 wherein the entertainment station includes a video cassette recorder/player.

5. The interior bus configuration of claim 1 wherein the entertainment station includes a compact disc player.

6. The interior bus configuration of claim 1 wherein the entertainment station includes an audio player.

7. The interior bus configuration of claim 1 wherein the entertainment station includes a video cassette recorder/player, a compact disc player and an audio player.

8. The interior bus configuration of claim 1 further including a wet bar in the rear of the bus adjacent the restroom area.

9. The interior bus configuration of claim 1 wherein each seat is a theater-type reclining seat.

10. The interior bus configuration of claim 9 wherein the back of each seat is provided with a tray table and reading light configuration.

11. The interior bus configuration of claim 1 further including an access door in the exterior of the bus located at a position just behind a front tire of the bus.

12. An interior bus configuration comprising:
(a) a driver compartment at the front end of the bus,
(b) a passenger area toward the rear of the bus behind the driver compartment,
(c) the passenger area having a plurality of rows of seats, each seat facing toward the front of the bus, and each seat being a theater-type reclining seat,
(d) each row of seats mounted on a step on the interior floor of the bus,
(e) each step becoming progressively higher from the front of the bus toward the back so that the plurality of rows of seats are tiered,
(f) an entertainment station located on the interior of the bus between the driver compartment and the passenger area, and
(g) the back of each seat being provided with a tray table and reading light configuration comprising:
(1) a component mounted in the back of the seat, said component having a light slot and a table slot,
(2) a light arm pivotally mounted in the light slot, said light arm having a reading light mounted therein,
(3) a tray table pivotally mounted in the table slot, said tray having a plate holder area and a glass holder area, each recessed in the tray table, and
(4) a latch pivotally mounted on the component to secure the tray table when it is pivoted into a closed position.

13. An interior bus configuration comprising:
(a) a driver compartment at the front end of the bus,
(b) a passenger area toward the rear of the bus behind the driver compartment,
(c) the passenger area having a plurality of rows of seats each seat facing toward the front of the bus,
(d) each row of seats mounted on a step on the interior floor of the bus,
(e) each step becoming progressively higher from the front of the bus toward the back so the plurality of rows of seats are tiered,
(f) an entertainment station located on the interior of the bus between the driver compartment and the passenger area, and
(g) the back of each seat being provided with a tray table and reading light configuration comprising:
(1) a component mounted in the back of the seat, said component having a light slot and a table slot,
(2) a light arm pivotally mounted in the light slot, said light arm having a reading light mounted therein,
(3) a tray table pivotally mounted in the table slot, said tray table having a plate holder area and a glass holder area, each recessed in the tray table, and
(4) a latch pivotally mounted on the component to secure the tray table when it is pivoted into a closed position.

* * * * *